(12) United States Patent
Aguera y Arcas et al.

(10) Patent No.: US 7,930,434 B2
(45) Date of Patent: Apr. 19, 2011

(54) SYSTEM AND METHOD FOR MANAGING COMMUNICATION AND/OR STORAGE OF IMAGE DATA

(75) Inventors: Blaise Aguera y Arcas, Seattle, WA (US); Julian Walker, Seattle, WA (US); Ian Gilman, Seattle, WA (US)

(73) Assignee: Microsoft Corporation, Redmond, CA (US)

( * ) Notice: Subject to any disclaimer, the term of this patent is extended or adjusted under 35 U.S.C. 154(b) by 1013 days.

(21) Appl. No.: 11/252,181

(22) Filed: Oct. 17, 2005

(65) Prior Publication Data

US 2006/0176305 A1 Aug. 10, 2006

Related U.S. Application Data

(63) Continuation-in-part of application No. 10/790,253, filed on Mar. 1, 2004, now Pat. No. 7,075,535, and a continuation-in-part of application No. 10/854,117, filed on May 26, 2004, now Pat. No. 7,042,455, and a continuation-in-part of application No. 11/141,958, filed on Jun. 1, 2005, now Pat. No. 7,546,419, application No. 11/252,181, and a continuation-in-part of application No. 11/247,513, filed on Oct. 11, 2005.

(60) Provisional application No. 60/619,118, filed on Oct. 15, 2004, provisional application No. 60/619,053, filed on Oct. 15, 2004, provisional application No. 60/452,075, filed on Mar. 5, 2003, provisional application No. 60/453,897, filed on Mar. 12, 2003, provisional application No. 60/475,897, filed on Jun. 5, 2003, provisional application No. 60/474,313, filed on May 30, 2003, provisional application No. 60/575,987, filed on Jun. 1, 2004, provisional application No. 60/617,485, filed on Oct. 8, 2004.

(51) Int. Cl.
*G06F 15/16* (2006.01)
(52) U.S. Cl. ......... 709/247; 709/204; 709/219; 345/428
(58) Field of Classification Search .................. 709/204, 709/219, 247; 345/428
See application file for complete search history.

(56) References Cited

U.S. PATENT DOCUMENTS

| | | | |
|---|---|---|---|
| 4,532,605 | A | 7/1985 | Waller |
| 4,549,275 | A | 10/1985 | Sukonick |
| 4,597,057 | A | 6/1986 | Snow |
| 4,847,788 | A | 7/1989 | Shimada |
| 5,222,205 | A | 6/1993 | Larson |
| 5,237,647 | A | 8/1993 | Roberts et al. |
| 5,367,615 | A | 11/1994 | Economy et al. |
| 5,471,572 | A | 11/1995 | Buchner |

(Continued)

OTHER PUBLICATIONS

International Search Report and Written Opinion in PCT/US/2006/011405.

(Continued)

*Primary Examiner* — Yves Dalencourt
(74) *Attorney, Agent, or Firm* — Shook, Hardy & Bacon LLP

(57) ABSTRACT

A system and method are disclosed, that may include establishing communication between a first computer and a second computer over a communication link, the second computer having an image collection stored therein in the form of compressed image data; selecting a plurality of images in the collection for communication to said first computer; and transmitting low-resolution image data for all of the selected images from the second computer to the first computer before transmitting full-resolution image data for any of the selected images.

41 Claims, 9 Drawing Sheets

U.S. PATENT DOCUMENTS

| | | | |
|---|---|---|---|
| 5,590,250 | A | 12/1996 | Lamping |
| 5,666,475 | A | 9/1997 | Salesin |
| 5,699,497 | A | 12/1997 | Erdahl |
| 5,760,783 | A | 6/1998 | Migdal et al. |
| 5,999,187 | A | 12/1999 | Dehmlow |
| 6,002,406 | A | 12/1999 | Zhao |
| 6,034,661 | A | 3/2000 | Servan-Scheiber |
| 6,154,213 | A | 11/2000 | Rennison |
| 6,184,894 | B1 | 2/2001 | Rosman |
| 6,191,793 | B1 | 2/2001 | Piazza et al. |
| 6,204,850 | B1 | 3/2001 | Green |
| 6,204,857 | B1 | 3/2001 | Piazza |
| 6,259,458 | B1 | 7/2001 | Theisen et al. |
| 6,313,837 | B1 | 11/2001 | Assa et al. |
| 6,324,621 | B2 | 11/2001 | Singh et al. |
| 6,343,350 | B1 | 1/2002 | LaMaire et al. |
| 6,348,921 | B1 | 2/2002 | Zhao |
| 6,356,659 | B1 | 3/2002 | Wiskott |
| 6,360,029 | B1 | 3/2002 | Moller |
| 6,373,495 | B1 | 4/2002 | Lin |
| 6,392,661 | B1 | 5/2002 | Tankersley |
| 6,400,372 | B1 | 6/2002 | Gossweiler, III |
| 6,424,933 | B1 | 7/2002 | Agrawala et al. |
| 6,453,330 | B1 | 9/2002 | Battle |
| 6,476,829 | B1 | 11/2002 | Smith |
| 6,493,858 | B2 | 12/2002 | Solomon |
| 6,501,482 | B1 | 12/2002 | Rosman |
| 6,505,205 | B1 | 1/2003 | Kothuri et al. |
| 6,509,892 | B1 | 1/2003 | Cooper et al. |
| 6,563,517 | B1 * | 5/2003 | Bhagwat et al. ............. 715/735 |
| 6,639,598 | B2 | 10/2003 | Piazza |
| 6,650,326 | B1 | 11/2003 | Huber |
| 6,681,056 | B1 | 1/2004 | Tseng et al. |
| 6,703,924 | B2 | 3/2004 | Tecu et al. |
| 6,708,309 | B1 | 3/2004 | Blumberg |
| 6,747,649 | B1 | 6/2004 | Sanz-Pastor |
| 6,763,137 | B1 | 7/2004 | Krtolica |
| 6,763,139 | B1 | 7/2004 | Andrew |
| 6,885,939 | B2 | 4/2005 | Schmidt et al. |
| 6,891,535 | B2 | 5/2005 | Perry et al. |
| 6,904,423 | B1 | 6/2005 | Nicolaou et al. |
| 6,907,345 | B2 | 6/2005 | Shipley |
| 6,909,965 | B1 | 6/2005 | Beesley |
| 6,912,462 | B2 | 6/2005 | Ogaki |
| 6,927,782 | B2 | 8/2005 | Coldefy |
| 6,943,811 | B2 | 9/2005 | Matthews |
| 6,961,754 | B2 * | 11/2005 | Christopoulos et al. ...... 709/204 |
| 6,981,119 | B1 | 12/2005 | Lepak et al. |
| 6,982,726 | B1 | 1/2006 | Berestov |
| 6,985,929 | B1 | 1/2006 | Wilson et al. |
| 6,993,476 | B1 | 1/2006 | Dutta et al. |
| 7,072,764 | B2 | 7/2006 | Donath |
| 7,075,535 | B2 | 7/2006 | Aguera y Arcas |
| 7,088,866 | B2 | 8/2006 | Andrew |
| 7,096,118 | B2 | 8/2006 | Cochlovius et al. |
| 7,107,285 | B2 | 9/2006 | von Kaenel et al. |
| 7,181,457 | B2 | 2/2007 | Reinauer et al. |
| 7,206,696 | B2 | 4/2007 | Furukawa |
| 7,248,262 | B2 | 7/2007 | Cao |
| 7,283,135 | B1 | 10/2007 | Cote et al. |
| 7,346,856 | B2 | 3/2008 | Nguyen et al. |
| 7,365,655 | B2 | 4/2008 | Rao et al. |
| 7,430,473 | B2 | 9/2008 | Foo et al. |
| 7,480,333 | B2 | 1/2009 | Rault |
| 7,542,882 | B2 | 6/2009 | Agrawala et al. |
| 7,600,183 | B2 | 10/2009 | Stern et al. |
| 2001/0030647 | A1 | 10/2001 | Sowizral |
| 2002/0075311 | A1 | 6/2002 | Orbanes et al. |
| 2002/0116586 | A1 | 8/2002 | Tremblay et al. |
| 2003/0026268 | A1 | 2/2003 | Navas |
| 2003/0135649 | A1 * | 7/2003 | Buckley et al. ............... 709/247 |
| 2004/0027258 | A1 | 2/2004 | Pechatnikov et al. |
| 2004/0056861 | A1 | 3/2004 | Huber et al. |
| 2004/0095400 | A1 | 5/2004 | Anderson et al. |
| 2004/0128070 | A1 | 7/2004 | Schmidt |
| 2004/0130579 | A1 | 7/2004 | Ishii et al. |
| 2004/0145679 | A1 * | 7/2004 | Kim .......................... 348/398.1 |
| 2004/0170332 | A1 | 9/2004 | Andrew |
| 2004/0187124 | A1 | 9/2004 | Labelle |
| 2005/0041858 | A1 | 2/2005 | Celi et al. |
| 2005/0065999 | A1 | 3/2005 | Acharya et al. |
| 2005/0149979 | A1 * | 7/2005 | Creamer et al. ............. 725/105 |
| 2006/0023956 | A1 | 2/2006 | Hugosson et al. |
| 2008/0025391 | A1 | 1/2008 | Amon et al. |
| 2009/0016433 | A1 | 1/2009 | Henocq et al. |

OTHER PUBLICATIONS

Chi, Chi-Hung, et al. "Pervasive Web Content Delivery with Efficient Data Reuse" Jul. 26, 2004, [online] [retrieved on Jun. 15, 2007] Retrieved from the Internet <URL:http://web.archive.org/web/20040726072942/http://2002.iwcw.org/papers/18500120.pdf> entire document (especially p. 8, col. 1, p. 9, col. 2, p. 11, col. 1, p. 13).

Bill Overall, Foveated Image: Applications to Image and Video Compress, Mar. 12, 1999, http://scien.standord,edu/class/psych221/projects/99/wro.

Foley et al., Computer Graphics: Principles and Practice, Addison-Wesley Publishing Company Inc., 1997, p. 166-170.

Hierarchical Data Structures, CS488/688: Introduction to Interactive Computer Graphics, University of Waterloo, Feb. 18, 2001, http://web.archive.org/web/2001028051725/http://medialab.di.unipi.it/web/IUM/Waterloo/node73.html.

How to Read a United States National Grid (USNG) Spatial Address, 2000, http:/www.xyproject.org/How%20Read%20USNG/How%20to%20read%20USNG.htm.

Mix-in class for Parent Figures, May 10, 2000. http://web.archive.org/web/20030510164335/http://openhealth.com/bw/doc/auto/Parent.html.

Reading Topographic Maps, Feb. 14, 2003, http://web.archive.org/web/20030214004603/http://www.map-reading.com/ch4-3.php.

Space Variant Imaging, Nov. 25, 2002, http://web.archive/org/web/20021125075827/http://www.svi.cps.utexas.edu/index.htm.

TDB-ACC-No. NN 961137—Disclosure Title: Multidimensional Index Structure With Multi-Level Entry and Skip-Level Search for Partially-Specified Queries.—Publication-Data: IBM Technical Disclosure Bulletin, Nov. 1996, US.

The Annotated VRML 97 Reference, 1999, http://accad.osu.edu/~pgerstma/class/vnv/resources/info/AnnotatedVrmlRef/ch1.htm.

Williams, Lance, "Pyramidal Parametrics", Jul. 1983, pp. 1-11, ACM SIGGRAPH Computer Graphics, Computer Graphics Laboratory, New York Institute of Technology, Old Westbury, New York, vol. 17. Issue 3.

* cited by examiner

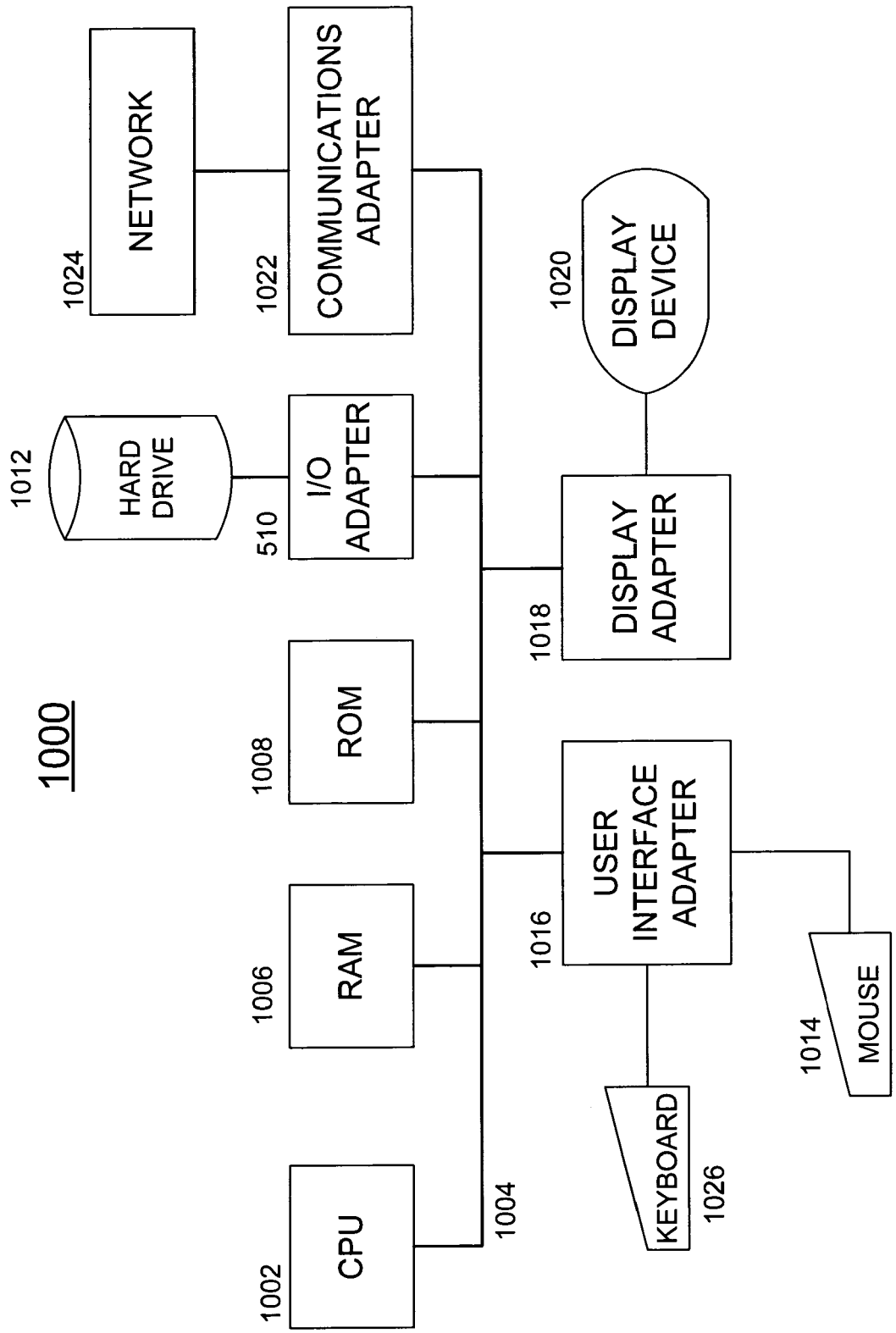

SYSTEM AND METHOD FOR MANAGING COMMUNICATION AND/OR STORAGE OF IMAGE DATA

CROSS-REFERENCE TO RELATED APPLICATIONS

This application claims the benefit of U.S. Provisional Patent Application Ser. No. 60/619,118, filed Oct. 15, 2004, entitled "Method for Efficiently Interacting with Dynamic, Remote Photo Albums with Large Numbers of Potentially Large Images" and U.S. Provisional Patent Application Ser. No. 60/619,053, filed Oct. 15, 2004, entitled "Nonlinear Caching for Virtual Books, Wizards or Slideshows", which applications are hereby incorporated herein by reference; this application is also a Continuation In Part of U.S. patent application Ser. No. 10/790,253, filed Mar. 1, 2004, which is now U.S. Pat. No. 7,075,535, which claims the benefit of U.S. Provisional Patent application 60/452,075, filed Mar. 5, 2003, U.S. Provisional Patent Application Ser. No. 60/453,897, filed Mar. 12, 2003, U.S. Provisional Patent Application Ser. No. 60/475,897, filed Jun. 5, 2003, and U.S. Provisional Patent Application Ser. No. 60/474,313, filed May 30, 2003; this application is also a Continuation in Part of U.S. patent application Ser. No. 10/854,117, filed May 26, 2004, which is now U.S. Pat. No. 7,042,455, entitled "System and Method for Multiple Node Display"; this application is also a Continuation in Part of U.S. patent application Ser. No. 11/141,958, filed Jun. 1, 2005, which is now U.S. Pat. No. 7,546,419, entitled "Efficient Data Cache", which claims the benefit of U.S. Provisional Patent Application Ser. No. 60/575,987, filed Jun. 1, 2004, entitled "Zeno Cache: a System for Increasing the Effectiveness of Most-Recently-Used (MRU) Caching for Variably Compressable Data Objects"; this application is also a Continuation in Part of U.S. Non-Provisional Patent Application No. 11/247,513 filed Oct. 11, 2005, entitled "System and Method for Efficiently Recording Data" which claims the benefit of U.S. Provisional Patent Application Ser. No. 60/617,485, filed Oct. 8, 2004, wherein all of the above listed applications are hereby incorporated by reference herein. U.S. patent application Ser. No. 10/803,010, which is now U.S. Pat. No. 7,133,054, is hereby incorporated by reference herein. U.S. patent application Ser. No. 11/082,556, which is now U.S. Pat. No. 7,254,271, is hereby incorporated by reference herein. U.S. Provisional Patent Application Ser. No. 60/622,867 is hereby incorporated by reference herein.

U.S. patent application Ser. No. 10/803,010 is hereby incorporated by reference herein. U.S. patent application Ser. No. 11/082,556 is hereby incorporated by reference herein. U.S. Provisional Patent Application Ser. No. 60/622,867 is hereby incorporated by reference herein.

BACKGROUND OF THE INVENTION

Recently developed image compression and transmission standards such as JPEG2000/JPIP have enabled the interactive display of large images (i.e. gigapixels in size) over narrow bandwidth communication channels. However, these emerging standards and technologies do not provide means for achieving a more ambitious goal: to allow flexible visual interaction with a very large number of images simultaneously, each of which may also potentially be very large. Accordingly, there is a need in the art for an improved system and method for an improved system and method for transmitting and/or storing image data.

SUMMARY OF THE INVENTION

According to one aspect, the present invention provides a method that may include establishing communication between a first computer and a second computer over a communication link, the second computer having an image collection stored therein in the form of compressed image data; selecting a plurality of images in the collection for communication to said first computer; and transmitting low-resolution image data for all of the selected images from the second computer to the first computer before transmitting full-resolution image data for any of the selected images.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 10 is a block diagram of a computer system that may be adaptable for use with one or more embodiments of the present invention.

DETAILED DESCRIPTION OF THE PREFERRED EMBODIMENTS

Figure 1:
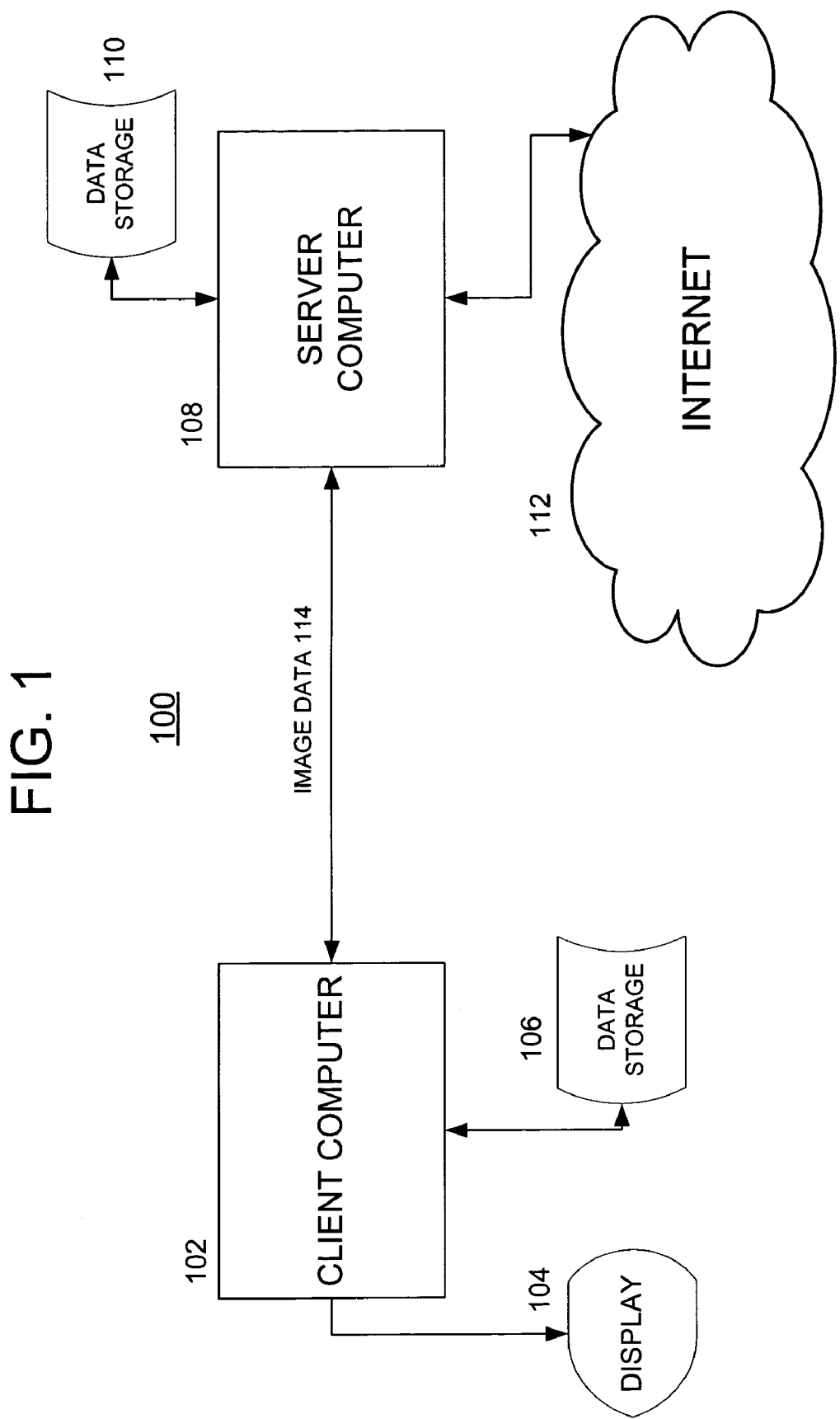
FIG. 1 is a block diagram of a system that may be connected to enable communication of image data a plurality of computers in accordance with one or more embodiments of the present invention.

FIG. 1 is a block diagram of a system 100 that may be connected to enable communication of image data between a plurality of computers in accordance with one or more embodiments of the present invention. System 100 preferably includes client computer 102 which is connected to display 104 and data storage device 106. System 100 preferably also includes server computer 108 which may be connected to data storage device 110. Server computer 108 may also be connected to the Internet 112.

In one or more embodiments, image data may be communicated between a plurality of computers 102, 108 so as to enable viewing of large collections of potentially large images using a relatively low-bandwidth connection therebetween. For instance, desirable viewing and navigation of images stored at server computer 108 may be accomplished by transmitting selected portions of the image data stored at server computer 108 at controllable levels of resolution. The selectivity of image data 114 may be such as to select a particular image at high resolution, or even a selected portion of a particular image at high resolution.

Herein, various embodiments are discussed that include varying the types of devices used as client computer 102 and server 108, the types of image data 114 transmitted therebetween, and various applications of the ability to transmit selected image data at specified levels of resolution.

Figure 2:
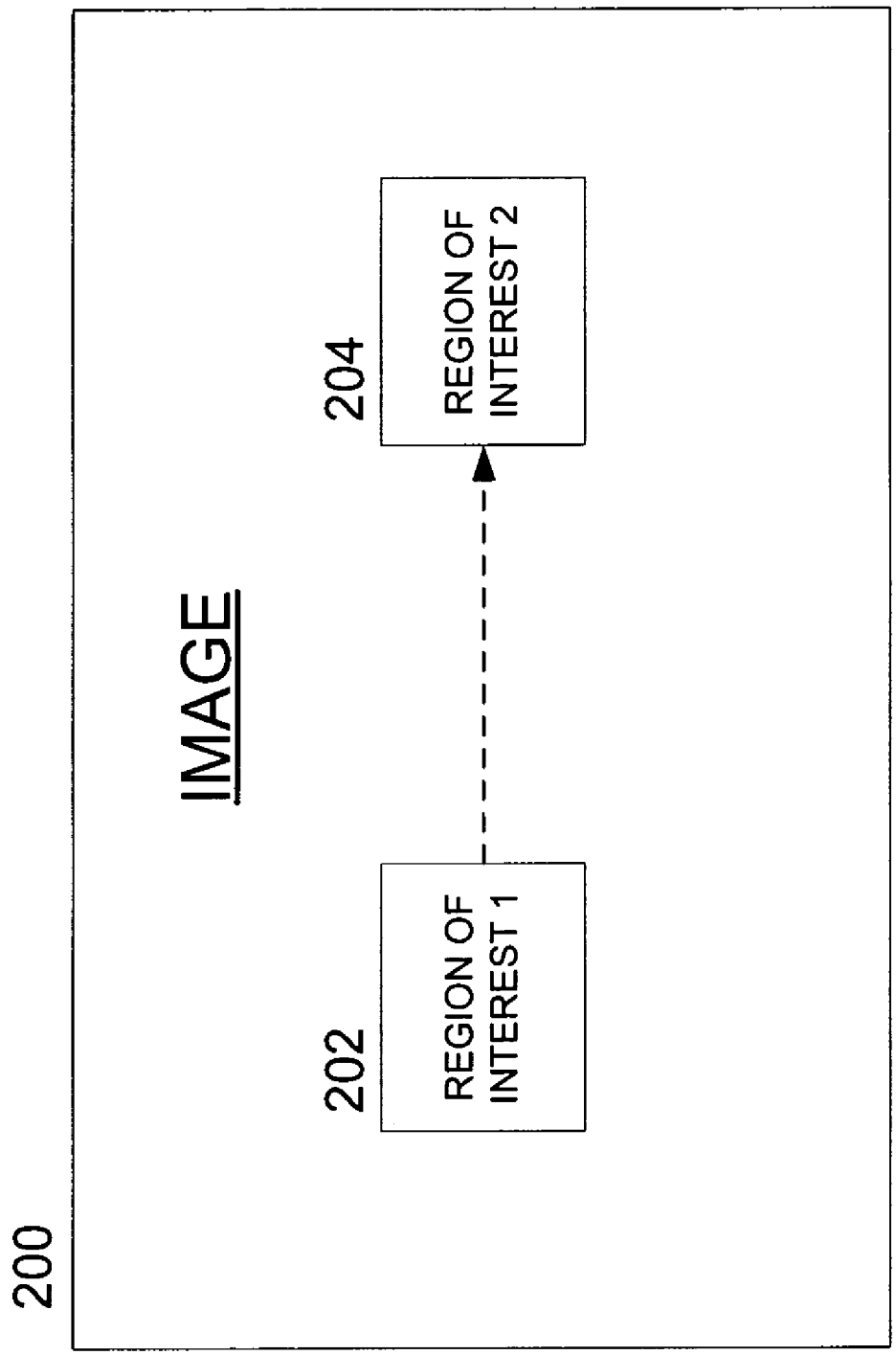
FIG. 2 is a block diagram of an image having at least two regions of interest therein in accordance with one or more embodiments of the present invention.

FIG. 2 is a block diagram of an image 200 having at least two regions of interest 202, 204 therein in accordance with one or more embodiments of the present invention. Image 200 could be a subset of image data 114. Alternatively, image data 114 could represent a subset of image 200, depending upon what image data is requested by client computer 102.

In one or more embodiments, image 200 may be stored in compressed form on server computer 108, or within storage device 110. Preferably, when stored in this manner, data for a plurality of resolution levels for various regions of image 200 may be stored and may be requested for downloading by client computer 102.

In one or more embodiments, the resolution level at which a particular image or region of an image is stored on client computer 102 may be readily increased or decreased. Where a prior download results in storage of region or image at a first resolution level (which may be less-than-full resolution), this first resolution level may be increased by adding data representing the next higher level of resolution, preferably without having to discard the data representing the first resolution, thereby avoiding redundancy and increasing the efficiency of the image data communication contemplated herein. Conversely, the resolution level of a region or image stored at client 102 may be decreased by discarding the highest level of resolution stored therein, without losing data corresponding to the lower levels of resolution for the same region or image. Such resolution reduction may be practiced at client 102 to clear data storage space needed for one or more regions or images other than the one for which data is being discarded.

The pertinent image compression may be provided by, for instance, the use of JPEG2000 or another discrete wavelet transform-based image compression scheme. However, the present invention is not limited to the use of any particular compression format or image data representation. Other formats may be employed, including image formats whose sizes in bytes are not substantially smaller than the uncompressed image data. It is merely preferable that the selected image format be susceptible to multiscale representation and storage of image data.

In one or more embodiments, client computer 102 may seek to download one or more regions of image 200, where such regions may be portions of image 200. The one or more regions of interest 202, 204 may be the only ones that client computer 102 seeks to download. Alternatively, client computer (client) 102 may merely seek to download one or more selected regions at higher resolution than the resolution at which the remainder of image 200 is downloaded. In either case, client 102 may request a download by identifying both a specified region of image 200 to download and a resolution level at which this specified region will be provided by server computer (server) 108.

In the example of FIG. 2, client 102 preferably requests a download of all of image 200 at low resolution. (The exact resolution level at which the bulk of image 200 is downloaded is not pertinent to this discussion). However, client 102 seeks to download region of interest 1 202 at a higher resolution, or even at full resolution. Accordingly, client 102 preferably specifies the coordinates and the desired resolution level of region of interest 1 202 to server 108. Thus, in addition to downloading the bulk (including that portion external to region of interest 1 202) of image 200 at low resolution, client 102 preferably downloads region of interest 1 202 at the specified higher resolution. In other situations, client 102 could seek to download only the region(s) of interest and omit a download of the remainder of image 200.

In this manner, a user of client computer 102 may view region of interest 1 202 at high resolution without having to download the entirety of image 200 at this high resolution. Thus, a relatively low-bandwidth data communication link between client 102 and server 108 could nevertheless transmit the entirety of image 200, while providing a region of particular interest (in this case, region of interest 1 202) at high resolution, thereby providing the viewer with the same viewing experience with respect to the region of interest that would have occurred had client 102 downloaded the entirety of image 200 at the high resolution, this latter option however demanding considerably more download time and data storage space at client computer 102 or data storage device 106.

Shifting the Region of Interest

In one or more embodiments, a user of client computer 102 may wish to pan across image 200. Normally, panning from one region of interest 202 to another 204 would involve having both regions downloaded at client 102 at the level of resolution at which the regions will be viewed. Moreover, generally, all image territory in between region of interest 1 202 and region of interest 2 204 would be stored at client computer 102 to enable the described panning to occur. As described in the following, in one or more embodiments of the present invention, viewing of such regions of interest 202, 204 may be accomplished by downloading much less data and using less storage space at client computer 102 than in the approach described above.

In one or more embodiments, client 102 may shift from a high resolution view of region of interest 1 202 to region of interest 2 204. Preferably, image data corresponding to a low-resolution representation of region of interest 2 204 is already present in client computer 102 from the download of image 200, discussed above. In this case, all that is needed is to supplement the existing image data for region of interest 2 204 with additional image data describing the pertinent higher levels of resolution to arrive at a high-resolution rendition of region of interest 2 204 at client computer 102. If needed, image data representing the higher resolution levels of region of interest 1 202 may be discarded or overwritten to make space in data storage device 106 or other data storage space for the additional image data to be downloaded for region of interest 2 204.

In one or more embodiments, the shift in view from region of interest 1 202 to region of interest 2 204 may be accomplished gradually, to provide a viewer of display 104 with a viewing experience that may closely simulate that available on a computer that has the entirety of image 200 downloaded at high resolution. Specifically, the level of resolution at which region of interest 1 202 is displayed may be reduced gradually to the resolution level at which most of image 200 is represented. Thereafter, the view on display 104 may present a gradual pan across the low-resolution territory in between region of interest 1 202 and region of interest 2 204. Finally, upon arriving at region of interest 2 204, the view on display 104 may increase toward a high-resolution rendition of region of interest 2 204 either after completing the panning across image 200 or concurrently with the latter portion of this panning operation. Preferably, at the conclusion of the described process, region of interest 2 204 may be stored in client computer 102 at high resolution and may be displayed on display 104 at this high resolution.

Figure 3:
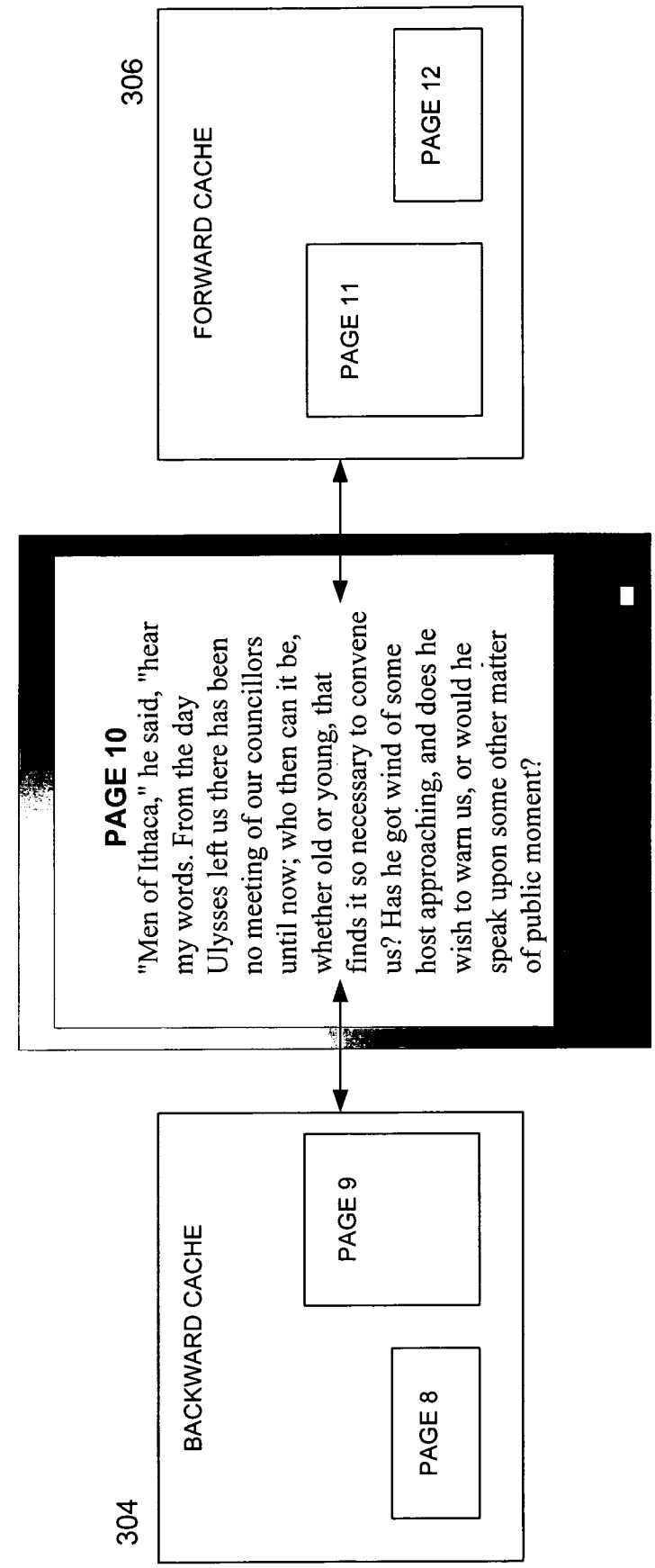
FIG. 3 is a block diagram of a "virtual book" that employs aspects of the technology disclosed herein in accordance with one or more embodiments of the present invention.

FIG. 3 is a block diagram of a "virtual book" 300 that employs aspects of the technology disclosed herein in accordance with one or more embodiments of the present invention. Virtual book 300 may include display 302, backward cache 304, and forward cache 306. While the caches 304, 306 are each shown having two pages stored therein, any number of pages may be stored in either of caches 304 and 306.

In one or more embodiments, virtual book 302 employs the ability to present selected image data at controllable levels of resolution for the particular case of virtual book 300. In virtual book 300, each image may be a page within display 302 of virtual book 300. Display 302 may correspond to display 104 of FIG. 1 or may be a special purpose display that accommodates the specific features of virtual book 300. Virtual book 3000 may correspond to client computer 102 of FIG. 1, or may be a special purpose computer that is substantially limited to communicating, storing, and displaying pages of books.

In one or more embodiments, virtual book 300 may include only one page that is stored and/or displayed at full resolution, with other pages, both earlier and later in the sequence of pages displayed, at a variety of other resolutions.

In one or more embodiments, the page currently displayed on display 104, i.e. the active page, is displayed at full resolution, which is "page 10" in FIG. 3. In such embodiments, other pages may be displayed at progressively lower resolutions with increasing distance in pages from the active page. More specifically, the resolution at which each page is stored may equal the resolution of the active page being displayed in display 306 divided the quantity equal to 2 raised to a power equal to the number of pages between each stored page and the active page. Thus, applying this approach, page 11 (in forward cache 306) and page 9 (in backward cache 304) may each occupy one half the amount of data storage space occupied by the active page in display 302. Continuing with this approach, page 12 (in forward cache 306) and page 8 (in backward cache 304) may each occupy one quarter the amount of data storage space occupied by the active page in display 302.

While in the above discussion, the amount of data storage space allocated to each page differs by a factor of two with respect to its immediately neighboring page, it will be appreciated by those of skill in the art that a value greater than or less than two may be employed as the division factor. Moreover, arithmetic formulae other than division of the data storage space of the active page by a constant may be employed to determine the allocation of data storage space to a succession of pages stored in caches 304 and 306.

In one or more embodiments, a new active page may be selected in place of page 10 which is shown displayed in FIG. 3. The new selected page may, but need not, be a page immediately adjacent page 10 (either page 9 or page 11). That is, any page from 1 to the last page in the pertinent book (or any other type of publication with discrete pages) may be the new active page.

In one or more embodiments, upon selection of the new active page, a transition between the currently active page and the new active page is preferably conducted. This transition to a new active page may include acquiring additional image data for the new active page to enable the new active page to be stored and/or displayed at full resolution. If the new active page is "page 11", and the "factor-of-two" embodiment, discussed above, is employed, the amount of data storage space allocated to page 11 will preferably double. Continuing with an application of the "factor-of-two" embodiment, the data storage space allocated to page 10 will preferably be halved as part of the transition away from page 10 and toward page 11, as the active page. The data for the active version of page 10 that is not included in the post-transition page 10 may be discarded (which may include overwriting thereof). Alternatively however, this "surplus" data for page 10 may be stored in another cache. Such caching of the page-10 surplus data may provide efficiency if a transition to page 10 occurs soon after (i.e. within a reasonable number of page transitions) the transition away therefrom.

In one or more embodiments, the transition from page 10 to page 11 (or other new active page) may include a gradual fade-out from page 10 and gradual fade-in of page 11, to provide an experience that is visually pleasing and/or reminiscent of a physical page transition to the user of virtual book 300. Optionally, a sequence of images showing the folding and turning of the old active page may be provided to make the virtual page transition look still more reminiscent of a physical turn of a page.

Figure 4:
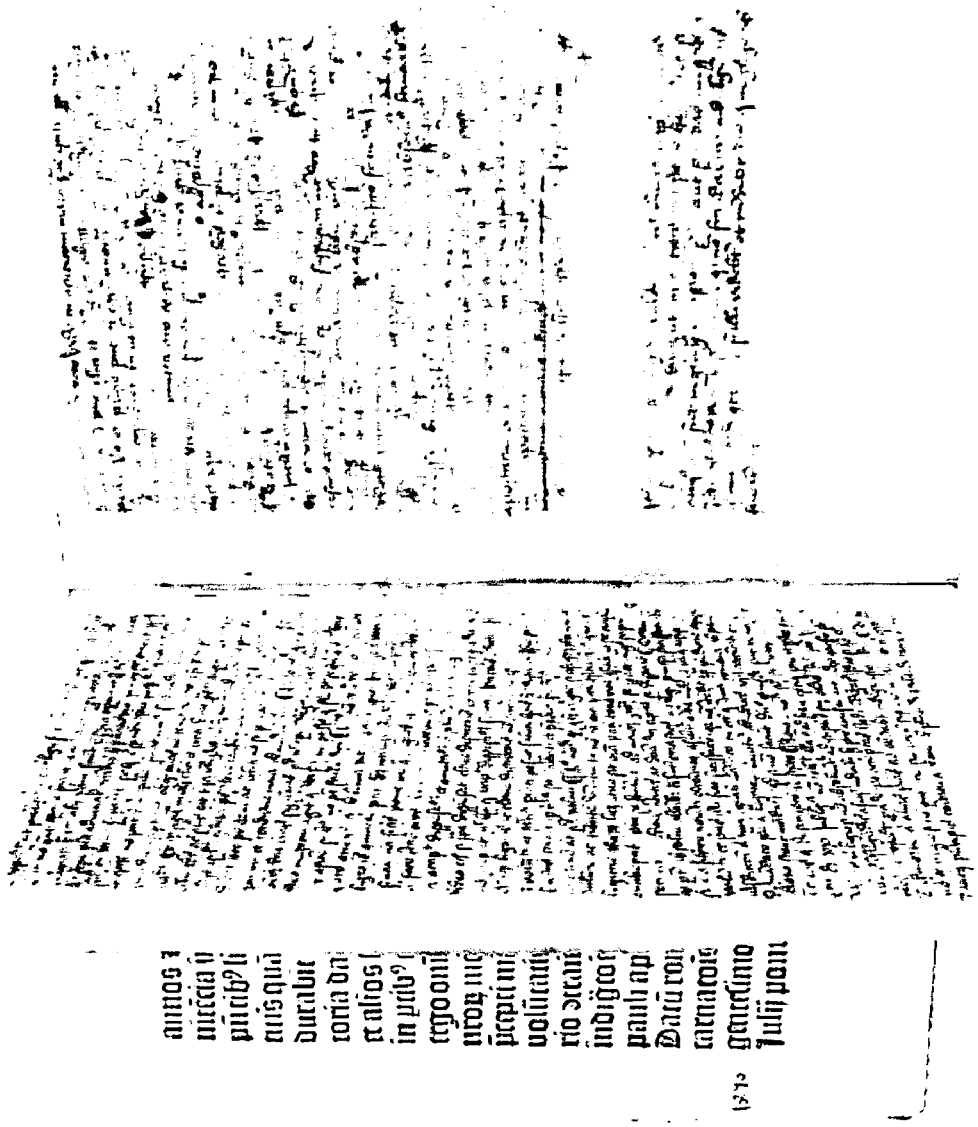
FIG. 4 is an illustration of a three-dimensional version of the virtual book of FIG. 3 in accordance with one or more embodiments of the present invention.

FIG. 4 is an illustration of a three-dimensional version of the virtual book of FIG. 3 in accordance with one or more embodiments of the present invention. The embodiment of FIG. 4 illustrates a method in which an alpha channel, for partial transparency (the rough edges) may be stored as image information in addition to the red, green and blue color components. While color components are discussed above, for the sake of convenience, only a black and white rendition of the image of FIG. 4 is provided herein.

In one or more embodiments, hardware-accelerated texture mapping may be employed to support an alpha channel. Another feature that may be practiced in connection with either two-dimensional or three-dimensional embodiments of the virtual book is dynamic deformation of images, e.g. bending the pages of this book as they turn, as illustrated in FIG. 4.

Managing Image Data in One or More Portable Devices

In this section, a number of mechanisms for storing and interacting with the digital images, based on progressive and interactive visual collection transmission are described. In one or more embodiments of the present invention, variations on the methods disclosed herein allow near-instantaneous viewing, on a desktop computer, a mobile device, or other devices, of a large collection of images stored on a second mobile device; the use of remote storage to augment a mobile device's local memory for the purpose of viewing images; and browsing of large image collections from a mobile device. The various permutations enabled by one or more embodiments of the present invention may rely on a common client/server imaging and collection representation architecture.

One or more embodiments of the present invention may provide a method which may include providing a collection of digital images or other visual objects on a server; establishing communication between a client and said server; and enabling efficient multi-scale navigation by the client of collections of visual objects residing on the server.

In this disclosure, the term "digital image data" may include digital photographs, digital images, visual documents or other forms of visual content. Herein, the term "image" generally corresponds to the term "digital image," and either of these terms may correspond to a "digital photograph." Herein, the term "client" generally corresponds to the term "client side" and to the term "client device". Herein, the terms "portable device", "portable camera device", and "camera device" generally refer to a digital image capturing devices and/or digital image storage devices. Herein, a "digital image capturing device" may include but is not limited to a digital camera, a camera-enabled mobile phone (which may be referred to as a camera-enabled cell phone), a personal digital assistant, and/or a digital video recorder able to record digital still images. A "digital image capturing device" may include devices that are capable of receiving image data by directly optically receiving and recording such data (such as with a standard digital camera) and may also include devices that are able to receive image data via a wired or wireless Internet or other network connection.

One or more embodiments of the methods described herein may use a multi-resolution approach to address the problems of storing, synchronizing, browsing, and organizing collections of digital image data, which may be visual documents. Digital photos, which may be represented as arrays of color pixels at a certain resolution (e.g. 1024×768 pixels=0.75 megapixels, 2592×1944 pixels=about 5 megapixels, etc.), are a common visual document type that end-users may create in large numbers using digital cameras, camera-enabled mobile phones, and digital video recorders, among other devices.

One or more of the methods described herein may also apply to visual data objects other than images, such as the roadmap or other vector data of Applicant reference document 489/17NP (U.S. patent application Ser. No. 11/082,556) or the textual data of Applicant reference document 489/13 (U.S. Provisional Patent Application Serial No. 60/617,485) . . . (Both documents are identified in greater detail at the beginning of this document, and both documents are incorporated by reference herein).

A problem facing users of existing systems is that the camera devices can quickly create large numbers of potentially large visual documents. However, these devices typically don't have sufficient memory or visual browsing facilities to allow satisfactory archiving, viewing, or organization of these documents.

Digital photographs or other digital image data stored in a camera or other portable device are generally downloaded periodically to a desktop or notebook computer, cleared from the camera's memory to allow more pictures to be taken, and organized and/or viewed on the desktop or notebook computer. Thereafter, digital photographs may be shared with friends by posting a selection of digital photographs to one or more Internet sites.

Traditional Approach to Managing Image Data on Portable Devices

The following steps may be followed when using a conventional approach to managing image data on portable devices. First, a mobile device, which may be a digital camera or other digital image data capturing device, takes pictures. Then, potentially after some culling of the pictures, the pictures are downloaded to the camera user's PC (personal computer) and deleted from the camera device. The camera device's local storage may be limited and, in this conventional approach, only holds images transiently, until they are safely stored on the PC.

The PC may permanently retain in its memory (e.g. hard disk drive or other non-volatile storage) any subset of the digital photos. The user may in turn upload some further culled subset of those images to a web server which may be owned by a web photo publishing service, typically at reduced resolution. The images uploaded may be made publicly viewable by any third party using a web browser on a PC or other device, or by some subset of those users with restricted access.

Limitations of the existing approach may include lengthy download times from the camera device to the PC. There is also usually poor management of persistent storage on the camera device. Camera devices typically have small color displays on which viewers could theoretically view persistently stored images of the same type people commonly carry in their wallets (such as of family and pets) and photos associated with callers or other contacts on a PDA (Personal Digital Assistant). However, the limitations on persistent storage in existing camera devices makes the above task difficult to achieve.

Moreover, existing camera devices impose other limitations. In existing camera devices, navigation of images stored on the camera device is generally awkward and difficult. In existing camera devices, there is a lack of a unified visual interface to image collections which would give users a consistent experience either on the camera device or on a PC. Existing camera devices tend to impose very restrictive limits on the number of photos that can be stored thereon before downloading becomes necessary. Thus, when employing existing approaches, a lengthy series of steps is generally involved in making images available to a third party.

Managing Image Data According to One or More Embodiments of the Invention

Figure 5:
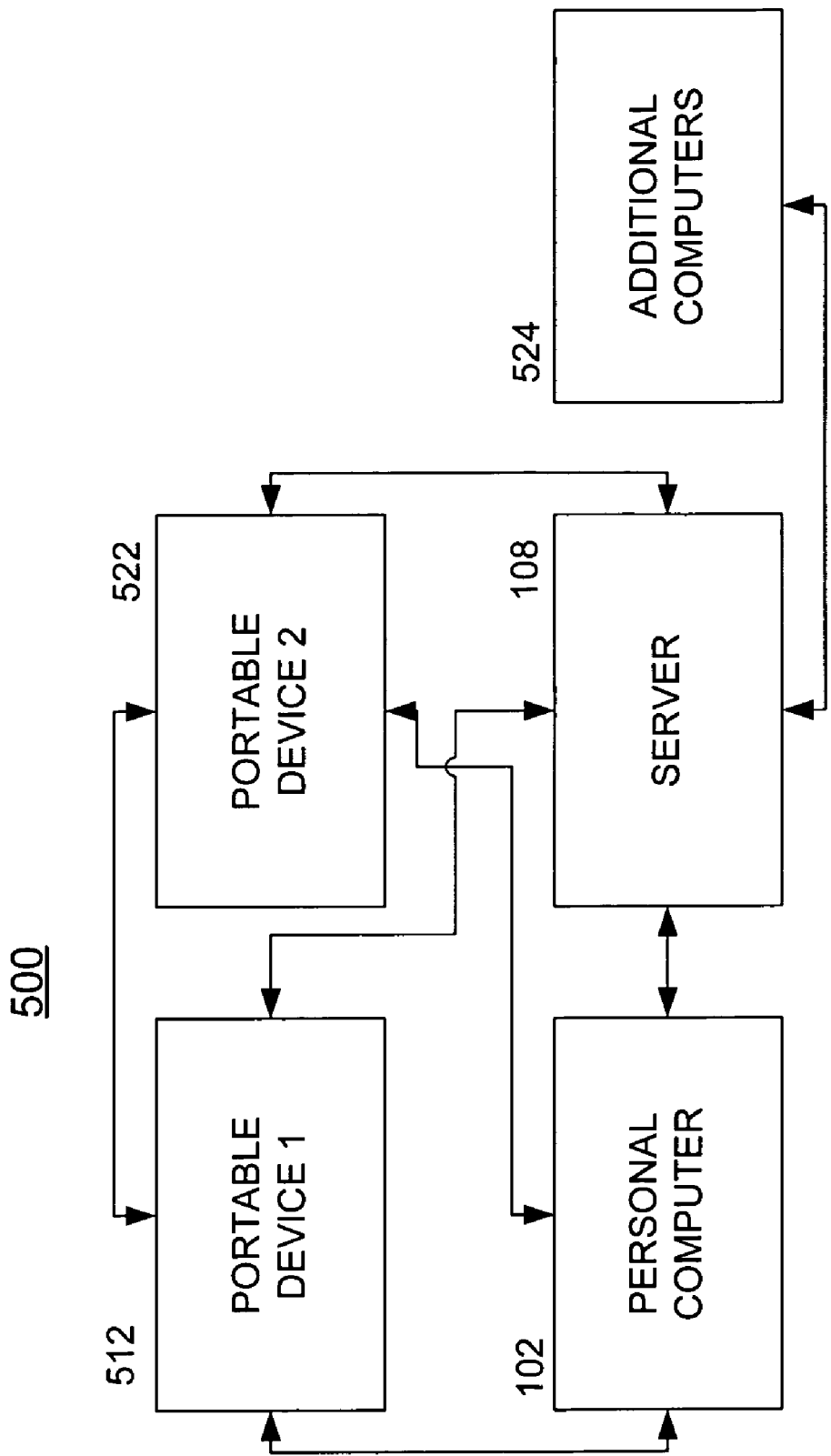
FIG. 5 is block diagram of a system for managing image data communication between one or more portable devices and one or more other computers in accordance with one or more embodiments of the present invention.

FIG. 5 is block diagram of a system 500 for managing image data communication between one or more portable devices 512, 522 and one or more other computers in accordance with one or more embodiments of the present invention. System 500 may include a client side 510 and a server side 520. However, in alternative embodiments, the client and server statuses of the groupings of devices shown in FIG. 5 may be reversed.

In one or more embodiments, system 500 may include portable device 1 512, portable device 2 522, personal computer 102 (which may be substantially the same as client computer 102 of FIG. 1), server 108 (which may be substantially the same as server computer 108 of FIG. 1) and/or additional computers 524. Preferably, each of devices 512, 522 and computers 102, 108, and 524, have memory and one or more displays included therewith. Alternatively or additionally, the devices and computers of FIG. 5 could be in communication with memories and/or displays.

FIG. 5 illustrates various possible data paths useable in accordance with one or more embodiments of the present invention. One or more embodiments may use less than all of the data paths shown in FIG. 5. The available data paths shown in FIG. 5 may have one or more of the following features in common: 1) The data paths may involve server side 520 (the originator of the image data) and a client side 510 (the recipient of the image data); 2) bi-directional data paths (which are illustrated with lines having arrows at both ends) indicate that the devices pointed to by these arrows are capable of serving in either a client or a server capacity; 3) the connections may employ a hard-wired network (e.g. Universal Serial Bus (USB), Firewire or Ethernet) or a wireless network (e.g., for nearby devices, Bluetooth, and for more remote connections, WiFi or a wireless wide-area networking protocol); and/or 4) the illustrated connections may or may not be ad-hoc.

In one or more embodiments, both the client side 510 and the server side 520 may include one or more digital computing and/or storage devices including but not limited to: camera devices, personal computers, and personal digital assistants.

In one or more embodiments, a client device (client) may have one or more displays. The client may browse a collection of documents residing on the server using one or more of the efficient multi-resolution browsing methods described in Applicant reference document 489/15P (U.S. Provisional Application Ser. No. 60/619,118, entitled "Method for Efficiently Interacting with Dynamic, Remote Photo Albums with Large Numbers of Potentially Large Images" which is incorporated herein by reference). These methods allow large collections of large images or other visual documents to be navigated efficiently over low-bandwidth connections. Zooming, panning, and dynamic rearrangement of such image collections are described in the referenced document.

In one or more embodiments, one of the properties of this navigation method is that the display contents may gradually come into focus as information is sent from the server to the client. The rate at which this information comes into focus may be governed by the ratio of connection bandwidth to display pixels. When the user zooms, pans, or rearranges the documents on the client side 510 such that new content becomes visible, this content again appears blurred, then comes into focus.

Virtual Display

In one or more embodiments, a client's "display" need not necessarily be physical, or visible to an end-user. In one or more embodiments, this display can be a "virtual display", i.e. an abstract model of a display with a specified resolution. Such a "virtual display" might be represented as an array of pixel values in the client's memory, irrespective of whether those pixel values are rendered to a screen. A virtual display may include wavelet data that at least partially describes one or more images. The wavelet data is preferably able to represent an image at a range of possible resolutions. In one or more embodiments, the wavelet data may correspond to that employed using JPEG2000. In one or more embodiments, a virtual display may include enough wavelet data to completely describe one or more images.

For example, if it were desirable for a device to acquire thumbnails of all of the images in a collection at a specified resolution, then this device could create a "virtual display" of the appropriate size, establish a connection with a server, and request a view of the entire collection. The full set of thumbnails could then be transmitted to and rendered on this "virtual display". If transmission were interrupted before all of the relevant data were sent from the server to the client, then the client's virtual display would not yet have all of the thumbnail images in perfectly focused condition. However, all of the requested thumbnail images would preferably be stored within the client's virtual display with sufficient resolution to enable rendering visible versions of these images on a screen. The images rendered in the manner described would generally be of lower visual quality than if the transmission of the image had concluded without interruption. Thus, some image degradation may be present in the images rendered using data from an incomplete, interrupted transmission.

Figure 6A:
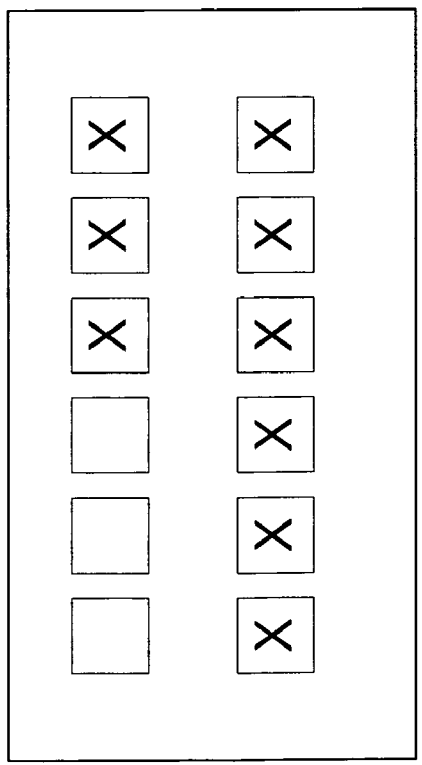
FIG. 6A illustrates the results of an incomplete image data download employing an existing approach.
Figure 6B:
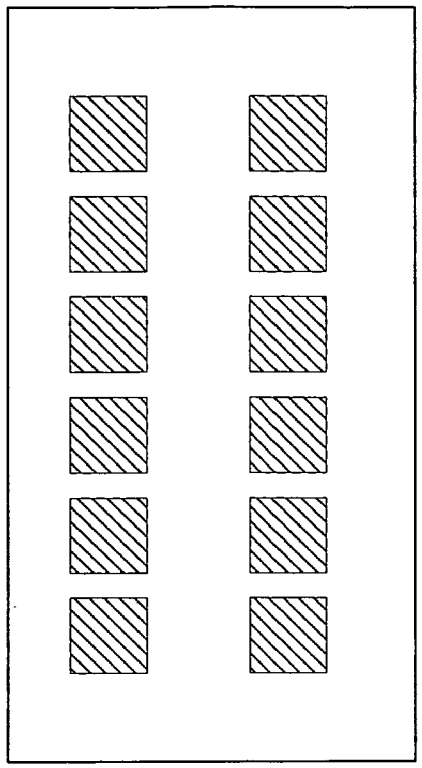
FIG. 6B illustrates the results of an incomplete image data download in accordance with one or more embodiments of the present invention.

Nevertheless, the described degradation is preferable to the prior art approach to sending a set of thumbnails across a network, in which the complete image of each thumbnail is transmitted in turn. Under this prior art approach, a premature interruption of connectivity would result in some thumbnails being available in their entirety (i.e. at full resolution) and would result in other thumbnails being completely unavailable. FIG. 6 illustrates this difference. FIG. 6A illustrates the results of an incomplete image data download employing an existing approach; and FIG. 6B illustrates the results of an incomplete image data download in accordance with one or more embodiments of the present invention.

FIG. 3A shows a prior art scenario in which all of the data for three thumbnails (shown with square shapes) have been received, and in which the remaining nine thumbnails (shown with X's) have not been received at all. FIG. 3B illustrates a situation that may arise employing one or more embodiments of the present invention, in which all twelve thumbnails (shown as cross-hatched square shapes) have been received at some level of resolution, which is preferably acceptable for viewing, but which is likely below the resolution that would be obtained after conclusion of a complete and uninterrupted data transmission.

In one or more embodiments, a client may have a client-side cache that caches recently viewed visual content. A standard MRU (most-recently-used) cache may be employed for the caching needs for one or more embodiments of the present invention. However, a cache disclosed in U.S. patent application Ser. No. 11/141,958 (client reference document 489/10NP), entitled "Efficient Data Cache", which is incorporated herein by reference, may be beneficially employed to enable more sophisticated client-side caching. In either case, a given amount of client-side memory may be devoted to the cache. Thus, navigation back to a recently viewed image may permit using image data stored in the cache, rather than requiring that this image data be re-sent from the server.

A client may have multiple displays. A given display may be physical or virtual. A given display may be driven directly by user input, or it may be driven programmatically by software within a client computer such as computer 102. The total size in pixels of all of the displays may be fixed or bounded by some limit, and this limit may define a minimum amount of client-side memory needed for visual content. This client-side memory is preferably separate from storage space allocated to the cache memory.

An embodiment involving both a physical display and a virtual display is described in the following. Preferably, a physical display within a client device is visible to the user and allows zooming and panning navigation through, and rearrangement of, a collection of digitally stored images. The user may also select one or more images from the collection and send them to a "holding pen" which may serve as a place for storing user-selected images. The holding pen may be visualized in some way on the physical display. Adding an image to the holding pen preferably causes the image to be placed on the virtual display, which may be invisible to the user. As images are added to the holding pen, the virtual display representing the holding pen gradually fills up.

This virtual display may increase in size (as measured in number of pixels) up to some limit, after which its size may remain fixed at this limit. The virtual display may be too small to display all of the images in the holding pen at full resolution. In this case, the data storage space needed for the images resident in the virtual display is preferably reduced as needed to fit the images into the virtual display. Hence, an off-screen view (the virtual display) preferably gets supplemented with images as the user puts viewable images into the holding pen. This supplementing of the off-screen view may occur invisibly to the user.

A method for browsing is disclosed in U.S. patent application Ser. No. 10/790,253 (Applicant reference document 489/

2NP), entitled "System and Method for Exact Rendering in a Zooming User Interface", which is incorporated by reference herein. The method disclosed in that document for determining the order in which information is sent from the server to the client based on the client's view may be modified for a multiple display scenario. The 489/2NP document discloses that visual information may be broken up into tiles, with each tile covering a region in space at a given resolution. Low-resolution tiles may then occupy large physical areas, while high-resolution tiles may occupy smaller physical areas, such that the amount of information in each tile may be substantially the same.

The 489/2NP document discloses methods for ordering tiles using criteria discussed in the following. One criterion may be tile resolution and tile position on the display. Sorting of tiles could be lexicographic, such that lower-resolution tiles always precede higher-resolution tiles, with spatial position only playing a role in resolving order within a resolution. (Lexicographic sorting is referenced here in the generalized tuple sense—for example, the lexicographic sort of the set of triplets {(1,2,3), (0,3,1), (4,0,0), (0,0,1), (0,3,2)} would be (0,0,1), (0,3,1), (0,3,2), (1,2,3), (4,0,0).)

Alternatively, non-lexicographic sorting criteria may be employed. For instance, a linear combination of a plurality of properties could be used to sort tiles. Such properties may include but are not limited to: resolution (which could be expressed in logarithmic units) and distance of the tile from the center of the display. Herein, the term "sort key" corresponds to the term "sorting criterion."

In this embodiment, lower-resolution tiles may be sent in preference to higher-resolution tiles, and tiles near the center of the display may be sent in preference to tiles near the periphery, but these properties can trade off against each other.

Preferably, minor changes may be implemented to adapt the above scheme for a multiple display scenario. In one embodiment, display number can be added as an extra lexicographic sort key. Thus, a first display might refine completely (in accordance with the other sort keys) before any tiles are sent relevant to a second display.

In another embodiment, display number can be an additional variable for inclusion in a linear combination, allowing display number to trade off in some fashion against resolution and proximity to the center of the display. In yet another embodiment, the displays can coexist in an imaginary "common space", and the resolution and proximity-to-center sort keys can be used as before. The "common space" is a notional space establishing an imaginary spatial relationship between multiple displays, as if they were regions of a single, larger display. Defining this imaginary spatial relationship determines all parameters needed for prioritizing tiles in the multiple displays.

Figure 7:
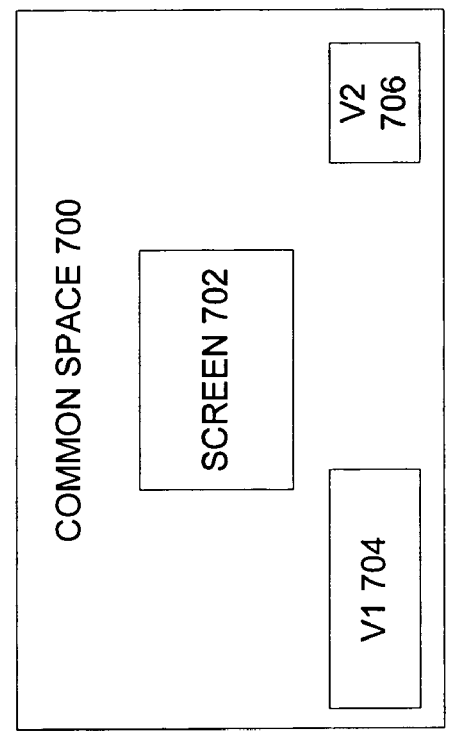
FIG. 7 is a block diagram of a "common space" that may include a physical display (screen) and two virtual displays in accordance with one or more embodiments of the present invention.

FIG. 7 is a block diagram of a "common space" 700 that may include a physical display (screen) 702 and two virtual displays 704, 706 in accordance with one or more embodiments of the present invention. The physical display 702 is preferably in the center of "common space" 700 at normal size. Virtual displays V1 704 and V2 706 are preferably off to the side, and V2 is preferably scaled down, so that its pixels are preferably half the linear size of the physical display's pixels. This means that, assuming purely lexicographic tile sort order, the contents of each resolution level in V1 706 will preferably be sent from the server to the client after the corresponding resolution for the physical display (since V1 is farther from the center of the space than any point on the physical display). Resolutions in V2 706 may be sent after all the tiles at a resolution twice as fine have been sent for both the physical display 702 and V1 704. It is noted that it isn't necessary for the "common space" 700 to correspond to any real larger display or memory address space. The "common space" 700 is merely a conceptual convenience for establishing the relationships among tile priorities across different displays.

Clearly many tradeoffs are possible. These tradeoffs can have the consequence, as in the lexicographic example above, of giving refinement of the physical display 702 the highest priority, while using any excess time and bandwidth not required for bringing the physical display into focus to continue refining the virtual display(s) 704, 706. The tradeoffs may alternatively begin refining the virtual display(s) after the physical display has largely, but not completely, come into focus. After the physical display 702 has largely come into focus, the physical and virtual displays 704, 706 can share bandwidth resources to refine in concert.

If the images in a collection are JPEG2000 images, then any subset of the data for a given image can itself comprise a JPEG2000 image file. During navigation of an image, the client may progressively download image data from the server, thereby supplementing the quality of the client's subset of the image and giving the client the ability to create a JPEG2000 file that is an increasingly accurate approximation of the full image.

If a client has navigated everywhere in an image, or has viewed the entire image at full resolution for long enough that all of the image data has been transmitted, then the client can recreate the entire original JPEG2000 file for that image. If a client has zoomed in closely on only a part of a large image, then the client could still create a JPEG2000 file, but it would lack detail everywhere except where the client zoomed in. This property of JPEG2000 can be extended to other multi-resolution document types as well. If the client never zoomed in beyond a given resolution, then no information would be available regarding the image content beyond that given resolution. In this case, the version of the JPEG2000 image which may be created and/or stored by the client may have a lower overall resolution than the original version of that image.

One application of the virtual display scenario described above is to ameliorate the problem of long download times for images from a camera. In one or more embodiments, the camera or camera-enabled mobile device may operate as the server, and a PC may operate as the client.

In one or more embodiments, rather than initiating a time-consuming batch download of all images to the PC, when the camera and PC are connected, the PC can rapidly browse through the complete set of images available on the camera. During navigation, a group of images can be selected and put in the holding pen. Note that if all images on the camera are to be downloaded to the PC in their entirety, then the total time needed to accomplish the transfer remains the same as in the prior art. However, as with the closely related problem of thumbnail transmission, this method can provide a number of advantages over the conventional serial download of images which are listed and discussed below. The present invention is not limited to the features listed below.

Image download and user navigation of the full image set on the camera or other mobile device may be concurrent and cooperative in their use of bandwidth (in effect, navigation merely influences the order in which tiles are sent from server to client).

If the PC's display is larger than the mobile device's display, then better choices can be made about which images to download, which to leave on the mobile device, and which to discard, without incurring the delay of downloading the entire set before deciding.

The experiences of browsing on the PC and on the mobile device (assuming that it also has a display), respectively, are preferably simple and experientially similar, thereby increasing usability.

If lower-resolution versions of the images in the holding pen are desired, it's preferably straightforward to suitably limit the detail of downloaded data by reducing the size of the item on the virtual display. It is noted that reducing the image size in this manner may both speed up downloading by a large factor—i.e. by a factor of 4 per resolution level discarded—and requires less space on the PC).

By limiting the size of the virtual display and reducing the number of images therein as desired, the amount of memory allocated to photos on the PC can be bounded. Also, different constraints can be placed on different photos, and hence space can be allocated based on recency or one or more other criteria.

In one or more embodiments, premature loss of connectivity results in a degradation in the quality of some or all of the images to be downloaded, instead of completely removing some images from the download operation. (Note that the bulk of the data volume for an image is very high-resolution detail, some of which is camera noise, and all of which is less critical for ordinary viewing than the coarser image structure. Hence, it is preferable to conduct the transmission of the high-resolution image data for all images after the lower-resolution image data for all of the images has been fully transmitted.) Hybrid prioritization of the image data is also possible, for example, favoring the complete download of a subset of the photos before proceeding to refine a second set beyond thumbnail detail.

In one or more embodiments, one or more methods disclosed herein are resilient to intermittent connectivity, since any JPEG2000 object can continue to be augmented at any time with additional information while still allowing browsing and interaction with whatever visual data has already been received.

With regard to the above references to a) reducing the size of the item on the physical display and b) bounding the amount of memory allocated to photos on the PC, it is noted that typical home users may not want to discard any of their images (after an initial culling of such images). If such users continue to add sufficient storage to their PC, then of course it should not be necessary to discard any content. The addition of storage can in itself increase the virtual display maximum size. Features of (a) and (b) above can therefore be omitted if a sufficiently large virtual display size can be created (i.e., if there is enough available client-side storage).

Because it may be unclear to the user on the client-side when the "holding pen" images are finished downloading, some form of visual indication for completion is desirable. As an example, checkmarks or green dots can appear next to images as they finish downloading. When all images in the "holding pen" include green dots, the connection can be broken without loss.

Operations such as requesting that the camera discard some of its images using the client computer (which may be a PC) may benefit from some additional communication from the client to the server beyond that contemplated in Applicant reference document 489/15P. In one or more other embodiments, the client side could also instruct the server side (which may be a mobile device such as a digital camera or mobile phone) to launch its own client side, and create its own view to receive content from the PC.

This is similar to "push" methods developed in the context of the World Wide Web. The PC can render the camera/mobile phone's "view" of content on the PC, thus (for example) displaying the green completion dots described above for images uploaded from the PC to the camera. Each of the reciprocal arrows of FIG. 5 can be implemented using either a "push" or "pull" arrangement. Specifically, the viewport setting, the arrangement, and other navigation settings may be controlled from either the client side 510 ("pull") or from the server side 520 ("push"). A user interacting with one device can be connected reciprocally to another device, thereby enabling both "pulling" and "pushing" to occur simultaneously.

We will now enumerate the potential client-server connections shown in FIG. 5, and describe briefly how they can be used and why they are useful.

A mobile device 512 which may be a camera or camera-enabled mobile phone may serve content to a user's PC (personal computer) 102. This connection might typically take place over a USB cable or a Bluetooth ad-hoc wireless network. The benefits are described above.

The PC 102 may serve content back to the mobile device 512. This can be useful for the following applications, among others.

"Wallet photos" can be sent from the PC to the camera or mobile phone, even if those photos weren't taken by the mobile device.

The PC may be a home appliance without a display, and the mobile device may then be used as a primary visual interface to the archived visual material. The mobile device in this context may be a digital camera, a camera-enabled cell phone, a PDA, or a mobile tablet PC with a display.

A first mobile device can be connected directly to, or form an ad-hoc network with, another mobile device (the "guest"). The two mobile devices can then view and share each others' photos.

The PC could upload images (via push) to a remote server. The server may be a photo sharing service, and may therefore implement the kind of space constraints envisioned in the above processes of reducing the size of the item on the physical display and bounding the amount of memory allocated to photos on the PC. The remote server could then serve its collection to one or more additional PCs. Typically this would be a broadband connection. However, other connection types could be employed.

The remote server could also serve collections to mobile device users. Typically this would be a mobile wireless wide-area network.

Mobile devices could upload their images via "push" (that is, under control of the mobile devices) to a remote server. In one or more embodiments, the upload may be automatic, allowing the mobile device to transparently extend its apparent storage space by transferring content freely to a server and deleting it locally when transfers are complete.

In connection with the last two items above, it is noted that local caching on the mobile device 512 may allow the mobile device 512 to support browsing through very large thumbnail collections using only local storage, even if the local storage is limited. Zooming in on details of recently viewed images may also be possible, if the relevant information is still in the mobile device's local cache.

Zooming in on images whose details are only available on a remote server could result in a blurry and un-detailed image. If the mobile device is on a network that includes the remove server 108 however, the blurry image can become progressively more refined as more and more detailed image data is downloaded to the mobile device 512. If the mobile device is not connected to a network that can supply additional image data, the image may not be presented with any greater detail than is available in the initial thumbnail image.

Montage of Low-Resolution Images

One or more embodiments of the present invention may define precomputed steps and interactive rendering algorithms which can be used in a variety of configurations to implement downloading of selected images and or image regions at controllable levels of resolution for various applications. Many of these applications (such as focusing on regions of interest, virtual book etc . . . ) may involve user interaction with a "universe" of images.

In one or more embodiments, the starting point for precomputation may therefore be a list of the filenames, URLS, or other strings referencing the individual images. When a user is zoomed out far enough to view all of these images at once, it is impractical for either the client or the server to traverse all of the image files, as there may be a very large number of them. For example, in the regime where individual images occupy 2×2=4 pixels onscreen, tens of thousands or hundreds of thousands of images may be in view. Even if these images support efficient low-resolution access, merely opening and closing 100,000 files involves a large overhead and could be impractical to accomplish on an interactive timescale. It may therefore be desirable to use a cached representation of low-resolution versions of these images, referred to herein as a "montage".

Figure 8:
FIG. 8 illustrates a collection of over one thousand images (a collection of digitized maps of various sizes) packed into a montage in accordance with one or more embodiments of the present invention.

In one or more embodiments, a montage may be a mosaic or collage of all of the images, rendered at low resolution and packed efficiently into a rectangular area, as shown in FIG. 8. Auxiliary metadata, which can be embedded in the montage image file or stored separately, may identify rectangular regions on the montage image with a particular image file.

In one embodiment, the montage image itself can be navigated using a zooming and panning interface. When the user zooms in far enough to exhaust the resolution available in the montage version of one or more images within the montage, the metadata for that image may refer the client to one or more individual image files, and the client may use imagery from these image files to render the images at higher resolution.

In one or more embodiments, the overall size of the montage in pixels may be chosen such that its resolution is only exhausted when zooming in to a stage where only a small number of images, which may be referred to herein as a "set" of images, are visible simultaneously. Therefore, access to more than this small number of images at high resolution is preferably not needed at any given time. During subsequent zooming and panning, image streams may be opened and closed as needed to limit the number of high resolution images that are open at any given time.

The above approach to navigating many images of high resolution incurs a limitation: the montage layout is preferably designed for packing efficiency, but the user may want a different arrangement of the images onscreen. Moreover, the user may want to be able to dynamically rearrange the layout of images on the screen.

Figure 9:
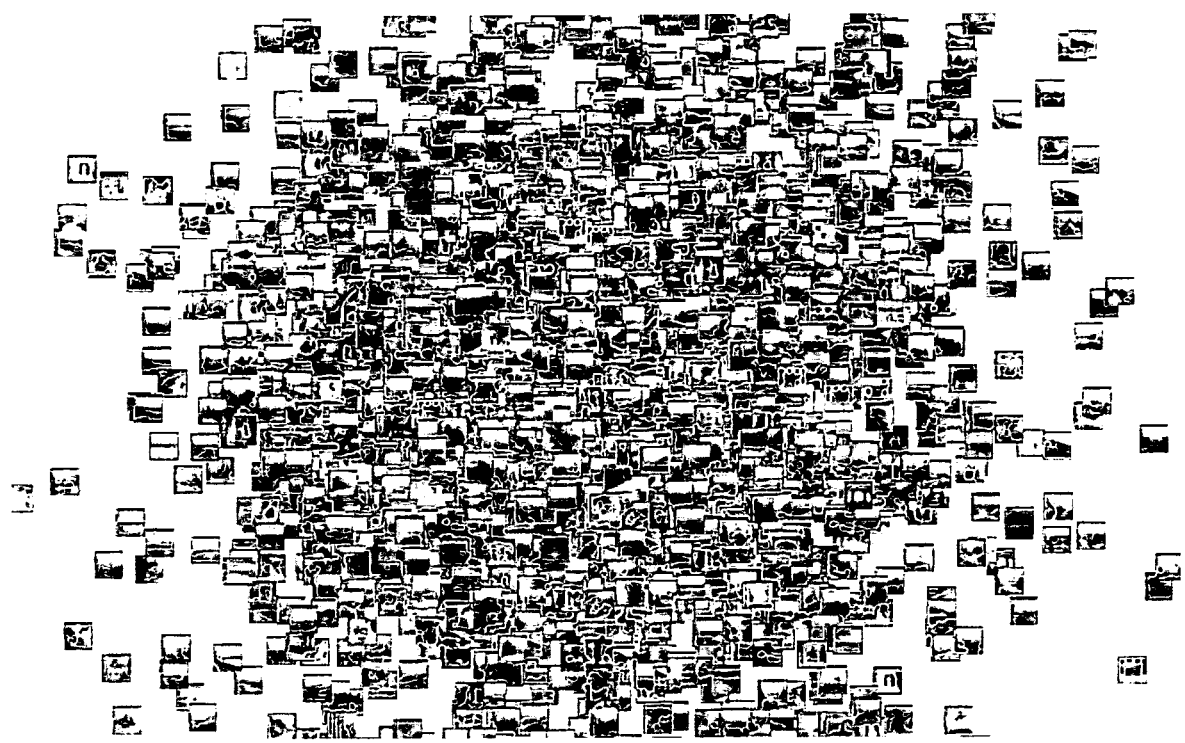
FIG. 9 illustrates a snapshot of about three thousand images that have been dynamically re-arranged into a random configuration in accordance with one or more embodiments of the present invention.

In one or more embodiments, to enable such rearrangement, we can make use of a graphics rendering technique known as "texture mapping", which may be implemented in software but is, in general, hardware-accelerated on modern personal computers. Texture mapping allows a portion of a "texture", or source image, to be drawn on the display, optionally rescaling the image, rotating it, and/or performing a three-dimensional perspective transform. Other hardware-accelerated transformations are often supported, including color correction or alteration, full or partial transparency, lighting, occlusion, and coordinate remapping. A low-resolution version of the montage can be used as a "texture", so that when the user is zoomed out, the individual images within the montage can be dynamically remapped in any way, as in FIG. 9. More than one texture map may be used, in which case each texture map may be a montage containing a subset of the images. Transitions between arrangements may or may not be animated. It is noted that rearrangement can take place while the user is zoomed in, but because the rearrangement might result in a new zoomed-in view of an image which was previously off-screen, the new image may initially be very blurry.

In another embodiment, the texture mapping technique may be used only during dynamic rearrangement of images. When the image arrangement is static, software compositing can be used to assemble all or part of a higher-definition rearranged montage on-screen. This software compositing method is especially valuable in combination with the multi-resolution rendering techniques described in U.S. patent application Ser. No. 10/790,253, (Applicant reference document 489/2NP), identified in detail earlier in this disclosure. This method may in effect creates a new "display montage" by rearranging the imagery of the original montage.

Texture mapping may also be used to display high resolution images, but in this case, rather than using textures containing montages of multiple images, textures are used that contain tiles of individual images. This technique is also described in U.S. patent application Ser. No. 0/790,253 (Applicant reference document 489/2NP).

In one or more embodiments, montage rearrangement may be used to support reorganization of the images without recourse to texture mapping.

In one or more other embodiments, texture mapping, software rendering, or any combination of the two may be used to render imagery in three dimensions instead of on a one-demensional plane. Dynamic rearrangement in three dimensions is also possible. Three-dimensional applications may include virtual galleries or other walk-through environments as well as virtual books. Virtual books are described herein and still further in Provisional Patent Application Ser. No. 60/619,053 which is incorporated herein by reference.

FIG. 10 is a block diagram of a computing system 1000 adaptable for use with one or more embodiments of the present invention. In one or more embodiments, central processing unit (CPU) 1002 may be coupled to bus 1004. In addition, bus 1004 may be coupled to random access memory (RAM) 1006, read only memory (ROM) 1008, input/output (I/O) adapter 1010, communications adapter 1022, user interface adapter 1006, and display adapter 1018.

In one or more embodiments, RAM 1006 and/or ROM 1008 may hold user data, system data, and/or programs. I/O adapter 1010 may connect storage devices, such as hard drive 1012, a CD-ROM (not shown), or other mass storage device to computing system 1000. Communications adapter 1022 may couple computing system 1000 to a local, wide-area, or Internet network 1024. User interface adapter 1016 may couple user input devices, such as keyboard 1026 and/or pointing device 1014, to computing system 1000. Moreover, display adapter 1018 may be driven by CPU 1002 to control the display on display device 1020. CPU 1002 may be any general purpose CPU. It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
    establishing communication between a first computer and a second computer over a communication link, said second computer having an image collection comprised of at least two images stored therein in the form of compressed image data;
    transmitting image data at a first resolution for said image collection to render a montage of the image collection, wherein said montage is a collage of said image collection having a layout of the at least two images that is configured to be rearranged by a user of the first computer;
    receiving a selection of a first image from said image collection as rendered in said montage, said selection received for viewing said first image at a higher resolution than said first resolution;
    transmitting at least a portion of the compressed image data for said first image from said second computer to said first computer, wherein said transmitting includes downloading, to said first computer, full-resolution image data for a first region of interest of said first image; wherein said transmitting at least a portion of the compressed image data further comprises: transmitting at least low-resolution image data for a region of said first image external to said first region of interest, wherein said low-resolution is a lower resolution than said higher resolution; and wherein said transmitting at least low-resolution image data further comprises: transmitting said image data for external region, wherein said external-region image data is provided at a resolution that increases with progressively increasing proximity to said first region of interest.

2. The method of claim 1 further comprising:
    at least partially reducing a resolution level at which said image data for said first region of interest is stored in said first computer; and
    downloading, to said first computer, additional image data for a second region of interest of said first image to enable rendering said second region of interest at full resolution.

3. The method of claim 2 wherein said second region of interest overlaps with said first region of interest.

4. The method of claim 2 wherein said second region of interest does not overlap with said first region of interest.

5. The method of claim 2 further comprising:
    repeating said at partially reducing step and said downloading additional image data step to provide a shifting region of interest.

6. The method of claim 1 further comprising:
    selecting a plurality of additional images in said image collection;
    transmitting at least a portion of the image data for each of said selected images from said second computer to said first computer before transmitting an entirety of any of said selected images from said second computer to said first computer.

7. A method, comprising:
    establishing communication between a first computer and a second computer over a communication link, said second computer having an image collection comprised of a plurality of images stored therein in the form of compressed image data;
    receiving a selection of images in said collection for communication to said first computer, wherein the selection of images is fewer than the image collection;
    transmitting low-resolution image data for all of said selected images as a montage from said second computer to said first computer before transmitting full-resolution image data for any of said selected images collection, the montage having a layout of the selected images that is configured to be rearranged by a user of the first computer;
    in response to receiving a user selection for a region of interest from the montage, transmitting full-resolution image data for the region of interest of the montage configured to be rearranged in the montage, the region of interest being less than all of the plurality of images; and the method further comprises: transmitting less-than-full resolution image data for the portion of said plurality of images external to said region of interest, wherein said transmitting said less-than-full resolution image data for said external portion of said plurality of images comprises: transmitting external portion image data such that the resolution at which said external portion of said plurality of images is stored at said first computer increases with progressively increasing proximity to said region of interest.

8. The method of claim 7 wherein said plurality of images are pages of a publication.

9. The method of claim 8 wherein said pages of said publication have a defined sequential order.

10. The method of claim 9 further comprising:
    rendering a first selected one of said pages at full resolution, wherein said first selected page is a first active page.

11. The method of claim 10 further comprising:
    rendering pages of said plurality of pages other than said first active page at less than full resolution.

12. The method of claim 11 further comprising:
    rendering said other pages at a degree of resolution that decreases with an increasing distance in pages from said first active page.

13. The method of claim 12 wherein said other pages are rendered at resolutions equal to said full resolution, at which said first active page is rendered, divided by a constant raised to powers equal to distances in pages by which respective ones of said other pages are located at with respect to said first active page.

14. The method of claim 13 wherein said constant equals two.

15. The method of claim 11 further comprising:
    discarding at least a portion of the image data enabling rendering said first active page at said full resolution;
    rendering a second selected one of said pages at full resolution, thereby making said second selected page a second active page.

16. The method of claim 15 wherein said second active page either immediately precedes or immediately succeeds said first active page in said sequential order of pages.

17. The method of claim 15 wherein said second active page is at least two pages away from said first active page in said sequential order of pages.

18. The method of claim 7 wherein said second computer is a portable device.

19. The method of claim 18 wherein said first computer is a personal computer.

20. The method of claim 18 wherein said first computer is a web server.

21. The method of claim 7 wherein said communication link comprises a direct link between said first computer and said second computer.

22. The method of claim 7 wherein said communication link comprises an Internet communication link.

23. The method of claim 19 wherein said portable device is a digital camera and said plurality of images are photos.

24. The method of claim 23 further comprising:
completing said transmission of said data for said photos to said personal computer from said digital camera.

25. The method of claim 24 further comprising:
uploading said photos to a web server.

26. The method of claim 24 further comprising:
storing said transmitted data in a virtual display of said personal computer.

27. The method of claim 26 wherein said virtual display includes wavelet data able to at least partially describe said images.

28. The method of claim 26 further comprising:
continuing said transmitting and said storing until said image data in said virtual display is represented at a specified resolution.

29. The method of claim 28 further comprising:
rendering said image data stored in said virtual display at said specified resolution on a physical display.

30. The method of claim 7 further comprising:
providing a cached representation of all images in said image collection in said first computer, wherein said cached representation is stored at lower resolution than said image collection stored in said second computer, said cached representation of said images being cache images within a cache of said first computer.

31. The method of claim 7 further comprising:
rendering said montage to a physical display of said first computer, said physical display displays said montage within a compact region of said physical display.

32. The method of claim 31 wherein said compact region is at least substantially rectangular.

33. The method of claim 31 further comprising:
zooming into and out of said montage.

34. The method of claim 31 further comprising:
panning of said montage.

35. The method of 31 further comprising:
associating metadata with one or more sets of said plurality of images, said sets having at least one of said plurality of image therein.

36. The method of claim 35 further comprising:
linking, with said metadata, each said sets to more detailed renditions of images within each said sets.

37. The method of claim 36 further comprising:
invoking said linking to said more detailed renditions using said metadata when navigation of said montage reaches a specified zoom threshold.

38. The method of claim 31 further comprising:
rearranging said plurality of images in said montage using texture mapping.

39. The method of claim 38 wherein said texture mapping is implemented in software.

40. The method of claim 38 wherein said texture mapping is hardware accelerated.

41. The method of claim 38 wherein said texture mapping comprises:
performing a three-dimensional perspective transform on said montage.

* * * * *